Patented June 17, 1952

2,600,403

UNITED STATES PATENT OFFICE 2,600,403

PARTIALLY HYDROGENATED FURFURALDEHYDE - KETONE REACTION PRODUCTS THICKENED UNDER ACIDIC CONDITIONS

Mortimer T. Harvey, South Orange, N. J., assignor to Harvel Research Corporation, a corporation of New Jersey No Drawing. Application February 16, 1950, Serial No. 144,594

11 Claims. (Cl. 260—64)

This invention relates to novel compositions of matter and to novel methods as well as to steps in said methods for producing them. More particularly this invention is directed to novel products and to methods for producing them with partially hydrogenated reaction products as starting materials. The organic reaction products before hydrogenation are produced by reacting under alkaline conditions, furfuraldehyde and a ketone. The class of ketones which are employed to provide said starting materials are those having at least two hydrogen atoms on an alpha carbon, such as acetone, diacetone alcohol, methyl ethyl ketone, acetonyl acetone, cyclohexanone, mesityl oxide, etc.

The first step in the preparation of the starting materials is to provide the unhydrogenated reaction products. This may be done by reacting under alkaline conditions furfuraldehyde with one or a combination of two or more of said ketones. For this purpose the furfuraldehyde and ketone are mixed with each other and then thereto is added a quantity of an alkaline material such as an aqueous solution of sodium hydroxide, potassium hydroxide, lime or the like. These three components are mixed with each other in an autoclave or closed unit and shortly after the mixture takes place, an exothermic reaction occurs and the pressure within the autoclave will rise. This vigorous reaction is not easily controlled by ordinary methods, such as by using reacting units which have air vents through the top, because under such conditions many times there may be losses of some of the reaction products escaping through the air vents. For this reason an autoclave is recommended as the reacting unit. After the exothermic reaction has subsided, the reaction is practically complete. In order to assure complete reaction and high yields, the mass in the autoclave is externally heated to maintain it in the state of boiling for a period of time depending upon the viscosity desired of the resultant reaction mass, which may vary from a thin liquid to a solid at room temperature. Generally, I prefer that the time of boiling is such that the viscosity of the reaction mass employed as a starting material when dehydrated is a liquid, that is, it is pourable at 25° C. and for some purposes at the present time no greater than approximately 20,000 cp. at 25° C. and in all cases no lower than 50 cp. at 25° C. This reaction provides compounds which are mono and di-furfuryl ketones, having the following formulae:

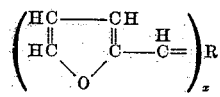

in which $x$ is a whole number selected from the group of 1 and 2, and R is a ketone lacking two of the hydrogen atoms normally on either one or both of its alpha carbons. These compounds are produced as a result of reaction between the furfuraldehyde and ketone wherein two hydrogens on the alpha carbons unite with the oxygen of the furfuraldehyde to split off water. This reaction also provides an amorphous or resinous material. The quantity of said resinous material present in the reaction mass varies and is dependent upon the time magnitude of boiling of the reaction mass and is approximately 5% or more of the reaction mass by weight and in general measures about 5%–60% by weight of the reaction mass. Because of the heat polymerization of said compounds, the percentage of residue or resin in said reaction mass is measured after the mass is hydrogenated as hereinafter set forth.

Reference is hereby made to the U. S. Patent No. 2,363,829 which issued to S. Caplan and me on November 28, 1944, and particularly to those examples therein disclosing compositions produced by reacting under alkaline conditions furfuraldehyde and a ketone having two hydrogen atoms on an alpha carbon and all these composition may be used as the unhydrogenated reaction products herein. The resultant reaction mass or any desired fractions thereof, some of which are the particular compounds and the resin hereinbefore identified, or mixtures of two or more of said fractions in any desired proportion may be hydrogenated and then polymerized or thickened under certain conditions to provide novel products. In this general example, the reaction mass will be treated, but any of the other aforesaid compositions may be used in place thereof.

Said resultant reaction mass may then be rendered substantially neutral in any convenient manner. This may be easily accomplished by adding thereto the requisite amount of an aqueous solution of an acidic agent, such as hydrochloric acid, sulphuric acid, lactic acid or the like. Generally it is preferable that the amount of acidic agent be such as to lower the pH of the mass to a value in the range of 3–7.4 and generally in the range of 3–6.

Following this step, the mass is substantially completely dehydrated. One method for doing this is to heat preferably under a high vacuum, until all of the water and any unreacted components have been substantially completely distilled off.

This completely dehydrated reaction product may then be hydrogenated only partially by employing a nickel catalyst, maintaining the temperature thereof at a value of at least 120° C. and preferably in the range of 120° C.–250° C. and the pressure thereof at a value of at least 25 lbs. per square inch and between 25–250 lbs. per square inch, but preferably in the range of 30–75 lbs. per square inch. The nickel employed may be in a finely divided state and may be coupled with any suitable carrier such as a hydrogenated vegetable oil, hydrogenated cardanol, etc.

Briefly, the hydrogenation may be accomplished by adding the requisite amount of nickel catalyst in the carrier to said dehydrated approximately neutral reaction product and the mixture is heated while vacuum is applied and agitated until a uniform mixture has been obtained. When the temperature of the mix reaches 120° C. the external source of heat is removed, hydrogen gas is admitted thereto to provide a pressure of 25–250 lbs. per square inch whereupon hydrogenation takes place and is an exothermic reaction. The addition of the hydrogen is continued whereupon the temperature of the mass rises and is maintained at a level no greater than 250° C. and the pressure is maintained at a value no greater than 250 lbs. per square inch and generally between 30–75 lbs. per square inch. The hydrogen is continuously added under the aforesaid conditions until the amount of added hydrogen is approximately 70–340 cubic feet measured at 20° C. and 760 mm. pressure. The hydrogen added is approximately 15%–65% of the quantity of hydrogen necessary for complete saturation of all the carbon to carbon double bonds thereof. The hydrogenation is discontinued after the desired degree of hydrogenation has been attained. Then the hydrogenated mass is allowed to cool to room temperature. By this procedure the reaction mass after hydrogenation is still unsaturated. The carbon to carbon double bonds of the compounds in said mass and outside of the furane ring have been at least 50% saturated with hydrogen, and may be 50%–100% saturated with hydrogen, with 0%–50% saturation with hydrogen of the carbon to carbon double bonds in the furane ring.

When the mass to be hydrogenated is of a very high viscosity, for example, over 20,000 cp. at 25° C., I first dissolved the mass in a solvent, such as a high molecular weight ketone, and then hydrogenated under the aforesaid conditions.

The partially hydrogenated reaction mass may be polymerized or thickened under acidic conditions to provide slightly to highly polymerized products which are thermosetting resins in the intermediate state which have unusual stability characteristics. These novel resins are air-drying when in film form, are lighter in color, may be heat converted to the infusible state and in that state give greater chemical resistance and are a great deal tougher than the cured unhydrogenated products. In general these polymers either of low or high molecular weight may be produced by adding to the hydrogenated mass or a fraction thereof an acidic catalyst such as sulphuric acid, phosphoric acid, hydrochloric acid, diethyl sulphate, zinc chloride, boron trifluoride, or the like to provide an acidic condition such that the pH of the mass is in the range of 0.3 to 4 and preferably in the range of 2–3.5. By employing a large amount of acidic agent no external heat is required. However, for commercial purposes I prefer to use a smaller amount of acidic agent and apply external heat to hasten the thickening. In factory practice external heat is applied to raise the temperature of the acidified mass to a temperature of at least 180° F. and generally 180° F.–450° F. and preferably 220° F.–350° F. until the polymerization or thickening has reached the desired degree as evidenced by increase in viscosity which in all cases is at least 100% greater than the viscosity of the hydrogenated mass at 25° C. before said polymerization or thickening. This is the test when the hydrogenated product before thickening is a liquid. However in all cases whether the hydrogenated product is liquid or solid, the thickening is continued under the aforesaid conditions until a solution of an equal volume thereof in acetone has a viscosity at 25° C. at least 100% greater than the viscosity at 25° C. of a solution in acetone of an equal volume of said hydrogenated product before said thickening.

Among some of the resins which may be produced by following the aforesaid procedure is a class of thermosetting resins which vary from a heavy viscous mass of the consistency of molasses (viscosity approximately 25,000–50,000 cp. at 25° C.) to a solid in the intermediate state and are capable of being heat converted at 250° F.–350° F. to the infusible state under acid conditions. All of these resins find various application: (a) they may be employed as plasticizers for the various normally solid polymers and copolymers of the vinyl esters and the normally solid polymers of the vinyl acetals and normally solid cellulose derivatives and also may be employed to produce gels therewith by heat dissolving a quantity of said normally solid material therein and then cooling and for these uses I prefer to employ the resins which at room temperature are normally liquid or pourable. Examples of these polymers and copolymers are polyvinyl chloride, polyvinyl acetate, copolymers of vinyl chloride and vinyl acetate, polyvinyl butyral, polyvinyl formal and polyvinyl acetal; and examples of the cellulose derivatives are cellulose nitrate, cellulose acetate, benzyl cellulose, alkyl ethers of cellulose, such as methyl cellulose, ethyl cellulose, etc.; (b) They may be used as plasticizers for natural rubber, reclaimed rubber, rubbery polymers of chloroprene, rubbery copolymers of butadiene and styrene and rubbery copolymers of butadiene and acrylonitrile, and in addition the gels of (a) may be intimately admixed with said rubber or rubbery material to provide improved millable compositions; (c) They may be employed alone or together with other materials to provide coating compositions wherein these resins may be cured to the infusible state, for example, paints, such as cream, green, brown, red or gray paints may be easily produced in the usual manner, an excellent outside green paint which dries overnight and has high alkali and acid resistance and good sunlight resistance may be produced with the following components: 100 grams of the fusible resin in a viscous state, 50 grams of xylol, 50 grams of titanium oxide, 30 grams of chrome green and 5 grams of manganese Soligen containing 6% of manganese; (d) They may be calendered with or without pigmentation and fillers, to the desired thickness and then cured to the infusible state; (e) These resins find particular application in the field of friction materials such as brake linings, clutch facings, etc. They may be employed as binders and/or friction augmenting materials, with or without other components, such as rubber, phenol-aldehyde resins, cashew nut shell liquid resins in the form of polymers and aldehyde reaction products, China-wood oil and various other constituents heretofore employed in the production of such products. When used as friction augmenting materials these resins after being converted to the solid state may be comminuted and the small particles, in the form of a powder or dust are ready to be combined with other materials for the provision of a brake lining in which these particles serve as friction augmenting material. Another particular application for said resins is to compound one or more of them with other resins, either synthetic or natural, such as polymerized coumarone-polymerized indene resins, phenol-aldehyde resins with or without inert fillers and then heating curing the combination; (f) They may be reacted under either acid, neutral or alkaline conditions with a reactive methylene containing agent to provide thermosetting resins in the intermediate or final state. Examples of the reactive methylene group containing agents are formaldehyde, paraformaldehyde, glyoxal, acrolein, aldol, hexamethylene tetramine, etc., as well as any of them that are available in their polymeric form. Generally, these novel condensation reaction products may be produced by mixing 150 parts by weight of the resin or one of the fractions thereof with 25–100 parts by weight of one of said reactive methylene containing agents. This mixture is heated to an elevated temperature, preferably at least to boiling, and is maintained at said temperature until a resinous condensation product of the desired viscosity is obtained. Then the mass is dehydrated and the resin is ready for use either with or without solvent and/or other materials. All of the various resins may be employed in floor coverings, table tops and other coating media because of their acid and alkali resistance characteristics; they may be employed for coating and impregnating glass cloth resulting in extremely high impact, and chemically resistant stock which may be used as tank liners, conduits, etc.; they may be employed as plasticizers for phenol-aldehyde resins, alkyd resins, etc. and such combinations may be used in the laminating field for the lamination of paper, wood, cork, metal, glass, etc.

The following Examples I–IV illustrate the general method for producing brake linings with the various resins produced by said polymerizing or thickening of the hydrogenated mass and the fractions thereof, as well as those produced by reacting a reactive methylene group containing agent with the product produced by said polymerizing or thickening of the hydrogenated mass until the viscosity is 100% or more at 25° C.

*Example I*

A length of woven or pressed, felted or matted asbestos of the desired dimensions and of the type commonly employed in the production of brake linings is first de-aerated and dehydrated and then soaked in a bath of one or a mixture of two or more of said resins to coat and/or impregnate the fibers thereof. This may be accomplished by placing a length of said material in a chamber which is heated and maintained under vacuum, then into said chamber is added said resin which is maintained therein under pressure of about 100 lbs per square inch and at a temperature of about 75° F.–200° F. The viscosity of said resin is preferably low and may be between about 200–600 cp. at 25° C. Then after about one to two hours of soaking the excess resin is removed and the resin-soaked asbestos material is allowed to drain overnight. Subsequently it is cured for about 24 hours in a temperature graduated oven starting at about 150° F. and reaching about 450° F. in that time. Upon removal from the oven and allowed to cool to room temperature, this cured coated and/or impregnated material will be found to be substantially dry, may be readily cut into the desired lengths and is sufficiently flexible to be formed around a brake drum and provides an improved brake lining. Said resin will be found to have been converted to a substantially dry infusible and solid resinous composition having good frictional properties.

If desired, said soaking bath may be made thinner by the addition thereto of a solvent such as methyl ethyl ketone. When a solvent is employed, the soaked material after draining is preferably subjected to a heating operation to remove the solvent therefrom before curing. Whatever type of soaking bath employed, there may also be included therein a quantity of an oil soluble heat reactive phenol-aldehyde resin, and preferably a thermosetting heat reactive substituted phenol-formaldehyde resin and the quantity by weight of said resin added thereto may be between about 10%–80% based on the quantity by weight of said thermosetting resin. The use of said phenol-aldehyde resin therein imparts increased hardness to the resultant cured brake lining. To impart increased softness, in place of said phenol-aldehyde resin, there may be employed the same quantity of a heat polymerizable and drying oil such as China-wood oil, linseed oil, etc.

Instead of omitting all of the phenol-aldehyde resin, said bath may contain both said oil and said phenol-aldehyde resin. In this case there may be prepared a solution of one of said phenol-aldehyde resins in said oil, with the ratio of the quantity of said phenol-aldehyde resin in said oil being in the range of 25–100 to 75–25. The solution may be obtained by heating a mixture of fusible phenol-aldehyde resin and said oil at a temperature of approximately 150° F. until solution is completed. The ratio of tthe amount of said phenol-aldehyde resin-oil solution in said bath to the quantity of said thermosetting resin may be in the range of 25–100 to 75–25. Also included in any one of said baths and with or without said phenol-aldehyde resins and/or said oils may be a quantity of a normally solid polyvinyl acetal with the ratio by weight of the quantity of said thermosetting resin to the quantity of the polyvinyl acetal being in the range of 1–100 to 12–100.

If desired, there may also be included in said bath a quantity of various other materials heretofore mentioned. In any of the combinations of materials as set forth, the final product after curing at the aforementioned curing temperatures results in an improved brake lining of asbestos fibers and a binder whose outer surface is a substantially dry, solid, infusible resinous composition having good frictional properties.

*Example II*

Instead of employing a length of said asbestos material to be impregnated and/or coated with said materials as set forth in Example I, a batch of asbestos fibers may be added directly thereto, mixed therewith, shaped and cured. For example, 100 parts of one of said thermosetting resins and 100 parts of a solvent for said resin, such as methyl ethyl ketone are placed in a mixer of the dough or cake mixer type and subjected to a mixing operation until there is a solution or substantially uniform distribution of these components with respect to each other. Then to said mass is added 200 parts of asbestos fiber together with additional solvent of such quantity that mixing may be done with comparative ease. Any of the other ingredients set forth in Example I may be added thereto and preferably in the proportions indicated therein and mixed therewith to provide a substantially uniform mix. After complete mixing the mass is removed from the mixer, the solvent is evaporated therefrom at temperatures of about 120° F. to about 140° F. and then is rolled or extruded into ribbons of the proper thickness and width and these ribbons are cured in temperature graduated ovens between about 150° F.–400° F. for a period of about 24 hours. After curing, these ribbons may be cut and ground to the desired dimension to provide brake linings having matted asbestos fibers with a binder therefor which has good frictional properties and which is substantially solid and infusible composition.

*Example III*

100 parts of rubber may be milled on a rubber mill and in the course of said milling there may be added thereto between 10–200 parts of one of said novel thermosetting resins having a viscosity between 2,000–20,000 cp. at 25° C. The milling is continued until there is a substantially uniform distribution of said resin into said rubber. Then this milled product may be cut into small pieces and placed in a swelling agent such as toluol. After standing for about from 1 to 3 days in said toluol, a fluid gelatinous mass is obtained. This mass may then be mixed with asbestos, sulphur and the usual rubber accelerators in the proportion of about 3 parts of asbestos to 1 of said solids in said mass. The swelling agent is then removed from said mixture by subjecting the same to a temperature of about 125° F.–150° F. and the resulting product is sheeted and formed into the desired shape, then cured in low pressure molds for approximately one hour and further heated in a graduated oven ranging from 150° F.–400° F. over a 24 hour period.

Instead of natural rubber, rubbery polymers of chloroprene, the rubber copolymers of butadiene and styrene or the rubbery copolymers of butadiene and acrylonitrile may be employed and when either of these is employed, xylol, for example, is used as the swelling agent. In any case, the resulting cured product includes a binder for the asbestos fibers which binder is a substantially infusible solid mass.

In commercial production these various brake linings include various fillers and modifying agents, such as barytes, cork, carbon black and the like heretofore generally employed in the production of brake linings and well known to the industry.

*Example IV*

Instead of employing said thermosetting resins as binders and frictional materials with asbestos for brake linings, said materials may be prepared in the form of comminuted materials and then incorporated in a binder for said asbestos and are retained in said binder as discrete particles. The binder employed may be any of those known to the art such as rubber, phenol-aldehyde resins, heat polymerized drying oils and the like or combinations of these or other materials heretofore used for this purpose.

A quantity of one of said thermosetting resins in a viscous state is poured into shallow pans and cured for 24 hours at about 300° F.–400° F. After that period, it will have been converted to the substantially dry, solid and infusible state. This dry mass is then comminuted in any convenient manner, by using for example differential rolls or a hammer mill. The mass is comminuted so that there is provided a relatively fine dust whose particle size is below about 20 mesh per square inch. This friction augmenting dust may be combined with the asbestos and binder therefor in the manner heretofore employed for the incorporation of dusts as components of brake linings. The usual manner is to incorporate in a brake lining of asbestos fibers, 8%–20% of dust based on the weight of the finished product, about double that amount of a binder, together with barytes, carbon black and other materials which may be used therewith.

The invention accordingly comprises the several steps and the relation of one or more of such steps with respect to each of the others, and the compositions which are exemplified in the following detailed disclosure, and the scope of the invention will be indicated in the claims.

The following Examples 1–7 are given merely to further illustrate the methods for providing the starting materials and are not to be construed in a limiting sense, all parts given being by weight unless otherwise indicated.

*Example 1*

Into a one-gallon pail is placed a quantity of sodium hydroxide weighing 2 lbs. 6 oz. Then there is added thereto sufficient water to fill the pail and the sodium hydroxide in the water is stirred until the sodium hydroxide is completely dissolved therein. Then in a Monel metal lined autoclave are placed 40 lbs. of furfuraldehyde and 24 lbs. of acetone. This autoclave is preferably provided with a mechanical agitator or stirrer which may be in the nature of a paddle mixer. This mixture is agitated and while in the state of agitation there is added thereto about 1/6 of the volume of said heretofore prepared aqueous solution of sodium hydroxide. With all the valves of the autoclave closed it will be noted that an exothermic reaction takes place in a very few minutes after the addition of the sodium hydroxide solution and the temperature of the mass continuously agitated by the stirrer will rise to approximately 150° F. in about three or four minutes. After about 10 minutes there is added to the mass in said autoclave another charge consisting of 40 lbs. of furfuraldehyde and 24 lbs. of acetone. Then to the mass in the autoclave there is added a second increment of said sodium hydroxide solution equal in volume to the first addition. After a few minutes the temperature of the mass will, due to the exothermic reaction, rise to approximately 165° F.–170° F. The foregoing steps are repeated four more times so that the amount of furfuraldehyde and acetone added to the autoclave are equal to 240 lbs. and 144 lbs. respectively and all of the initially prepared aqueous solution of sodium hydroxide has been added. After the last addition of sodium hydroxide the temperature of the mass within the autoclave will have stabilized to about 180° F.–195° F. Then the mass within the autoclave may be heated by means of a steam coil located therein and through a jacket carried thereby to maintain the temperature of the mass between approximately 185° F.–190° F. for about 30 minutes in order to complete the reaction and to obtain high yields. The steam is cut off from the coil and jacket and then there is added thereto an aqueous solution of sulphuric acid in quantities sufficient to render the mass practically neutral. In this instance there may be added an aqueous solution of sulphuric acid consisting of 3 lbs. 3 oz. of concentrated sulphuric acid diluted in 6 lbs. 6 oz. of water. Then this mass may be heated for about 5 minutes at a temperature between 175° F.–200° F. to substantially completely neutralize the mass. The substantially neutral mass may then be substantially completely dehydrated by heating the same to a temperature of 220° F. with or without vacuum yielding approximately 300 lbs. of dehydrated substantially neutral material known as Product A, whose viscosity at 25° C. is 92 cp. and having a specific gravity at 25° C. of 1.150. When this material, Product A, is distilled at a pressure of approximately .1 mm. of mercury pressure a fraction (37%) weighing approximately 110 lbs. comes off at temperatures in the range of 70° C.–85° C. and is hereinafter known as Fraction I; and a fraction (47%) measuring approximately 140 lbs. comes off in the temperature range of 150° C.–165° C. and hereinafter is known as Fraction II. The residue measuring approximately 50 lbs. is a brittle solid on cooling. Analysis of Fraction I established a carbon content of 70.30% and hydrogen of 5.48% which corresponds to the carbon and hydrogen values of furfural acetone having the following formula:

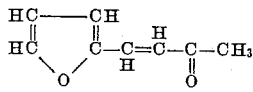

Analysis of Fraction II established a carbon content of 73.07% and a hydrogen content of 4.58% corresponding to the carbon and hydrogen values of difurfural acetone having the following formula:

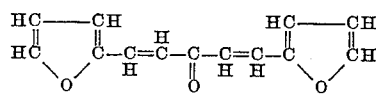

*Example 1A*

40 lbs. of Product A is placed in a 10-gallon closed unit equipped with a high speed propeller. Then one lb. of a catalyst and carried combination containing 25% of catalytic nickel dispersed in a hydrogenated vegetable oil is added thereto and the mixture is continuously stirred in order to maintain a uniform distribution of the components. While in this state of agitation, the mass is externally heated to a temperature of 120° C. after substantially all the air in the container has been evacuated therefrom. Then hydrogen is admitted to provide a pressure of 40 lbs. per square inch. Hydrogen is continuously admitted to the mass and hydrogenation takes place exothermically and now the external source of heat is removed therefrom. By controlling the sped of addition of the hydrogen to the mass, the temperature is maintained at approximately 200° C. and the pressure of approximately 50 lbs. per square inch. The temperature during hydrogenation may also be controlled by external cooling. The hydrogen addition is terminated when no more hydrogen is taken up under these conditions with a period of about 30 minutes. The quantity of hydrogen taken up in this particular hydrogenation step apparently due to early poisoning of the catalyst amounted to approximately 145 cubic feet which corresponds roughly to the quantity of hydrogen required to saturate only the unsaturated carbon to carbon atoms outside of the furane ring.

This hydrogenated Product A, hereinafter known as HA is still a thin liquid and may be distilled if desired to separate various fractions thereof. By distilling this hydrogenated Product A at 0.3 mm. of mercury pressure a fraction distilled off up to 100° C. and was collected and amounted to 32%; a second fraction amounting to 41% distilled off and was collected at 120° C.–170° C. That fraction which distilled off up to 100° C. is hereinafter known as Product HA-1 and consisted essentially of a compound having the following formula:

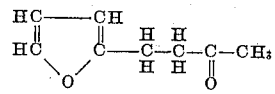

The second fraction which distilled off at 120° C.–170° C. is hereinafter known as Product HA-2 and consisted essentially of a compound having the following formula:

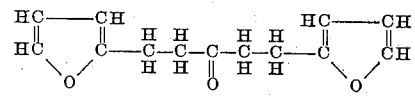

The residue known as HA-3 upon cooling was a brittle black solid.

*Example 2*

By using the same procedure as that set forth in Example 1, and substituting 180 lbs. of methyl ethyl ketone for the 144 lbs. of acetone, and terminating hydrogen addition when approximately 150 cu. ft. of hydrogen have been taken up, there may be produced a novel hydrogenated product. This hydrogenated product known as Product HB may be distilled to provide fractions HB-1 and HB-2 respectively chiefly consisting of the following compounds:

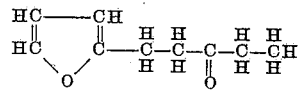

and

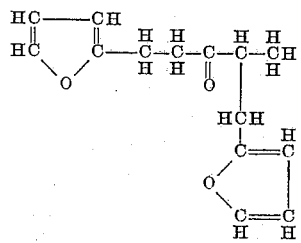

and a resinous residue HB-3 of more than 5% of the hydrogenated mass.

Example 3

By using the same procedure as that set forth in Example 2, and substituting 240 lbs. of diacetone alcohol for 180 lbs. methyl ethyl ketone, there may be produced a novel hydrogenated product known as HC. This hydrogenated product HC may be distilled to provide Fractions HC-1 and HC-2 respectively consisting chiefly of the following compounds:

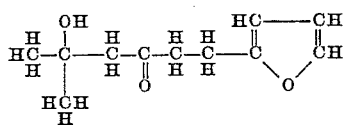

and

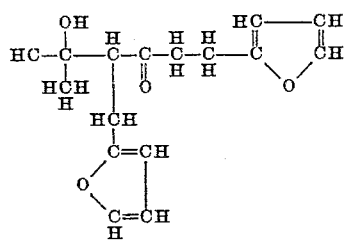

and a resinous residue HC-3 of more than 5% of the hydrogenated mass.

Example 4

Following the same procedure as that set forth in Example 1A and using fresh catalyst and terminating the hydrogenation after approximately 70, 100, 150, 175, 210, and 235 cu. ft. of hydrogen were taken up in six different 40 lb. batches of Product A, I obtained products HD, HE, HF, HG, HH and HI, differing from each other in the degree of hydrogen saturation.

Example 5

Following the same procedure as that set forth in Example 1A and employing fresh catalyst, 235 cu. ft. of hydrogen were taken up in a 40 lb. batch of Product A. Then the same amount of fresh catalyst, .25 lb. powdered nickel, was added thereto and hydrogenation continued until a total of 340 cu. ft. of hydrogen was taken up. This product is known as Product HJ.

Example 6

Following the same procedure as that of Example 1A and employing Fraction I of Example 1 in place of Product A, and terminating the hydrogenation after 1.3 and 1.8 moles proportionately of hydrogen were taken up by 1 mole proportion of said fraction, approximately 95 and 130 cu. ft. of hydrogen per 40 lbs. of Fraction I. The hydrogenation above the 1.3 mole proportion proceeded with difficulty. These two hydrogenated products are HK and HL and were respectively about 43% and 60% hydrogenated at the carbon to carbon double bonds.

Example 7

Following the same procedure as that of Example 1A and employing Fraction II of Example 1 in place of Product A, and 1 to 4 moles of hydrogen were taken up. Above 2 moles of hydrogen addition, additional increments of nickel catalyst were used. Various samples of 1, 2, 3 and 4 moles of hydrogen addition products are known as HM, HN, HO and HP respectively and respectively were approximately 15, 30, 50 and 65% hydrogen saturated at the carbon to carbon double bonds.

All of the various partially hydrogenated reaction masses such as HA etc. may be subjected to distillation to obtain the mono- and di-furfuryl ketone compounds and also a resinous residue which may be 5%-60% of the weight of the mass depending in part on the amount of residue in or the viscosity of the mass before hydrogenation.

These various hydrogenated products may be polymerized or thickened by heating them at 180° F.-450° F. under acidic conditions such that the pH thereof is in the range of 0.3-4. Generally the acidic agent employed is one such as sulphuric acid, hydrochloric acid, diethyl sulphate or the like. When diethyl sulphate is employed, there is added to said product a quantity of said diethyl sulphate measuring by weight between .3% to 3% of the weight of said product and in commercial operation the mixture may be maintained at about 240° F.-360° F. until the viscosity of the mass has increased at least 100%. When no heat is employed, the quantity of diethyl sulphate may be as high as 12%. When fusible thermosetting resins are desired, the reaction is continued until the resultant product is a fusible thermosetting resin. These fusible resins are very stable at room temperature even at their low pHs. However, if desired, there may be added thereto a quantity of an alkaline material to increase the pH of the resin at any desired value and preferably between 3 to 14. Instead of discontinuing the reaction when the thermosetting resin is in the intermediate or fusible state, it may be continued to convert the mass to the solid and substantially infusible state.

All of these various products HA, HB, HC as well as their fractions, examples of which are HA-1, HA-2, HA-3, HB-1, HB-2, HB-3, HC-1, HC-2 and HC-3 and the products HD, HE, HF, HG, HH, HI, HJ, HK, HL, HM, HN, HO and HP herein were thickened under acidic conditions to provide thermosetting resins which are tough and chemical resistant in their end state.

Example 8

Each of the aforesaid particular hydrogenated products was thickened or polymerized to provide a thermosetting resin in its intermediate state which resin was heat converted to the end state to provide an infusible tough resin having excellent chemical resistance and high impact strength. For this purpose a mixture of each of said partially hydrogenated products was intimately mixed with diethyl sulphate in the proportion of 6 lbs. of the former to 10-40 cc. of diethyl sulphate. In factory practice, it has been found that the greater the hydrogen saturation, the larger the amount of diethyl sulphate required. For example, 10 cc. of diethyl sulphate was employed with those products which took up 150 cu. ft. of hydrogen per 40 pounds, 20 cc. diethyl sulphate for those which took up 150-250 cu. ft. of hydrogen per 40 lbs. etc. Each mixture was heated and the temperature noted. The mixture while being constantly agitated in a container by stirring is heated to a temperature of approximately 260° F.-325° F. and maintained in this range whereupon an exothermic reaction takes place and the mass thickens rapidly. When the mass has attained the desired viscosity in the course of this exothermic reaction, the mass is cooled in any convenient manner, by the addition of cold xylol or other solvent or by external cooling. The reaction may be stopped after it has reached the stage where a sample thereof dissolved in an equal volume of acetone provides a solution having a viscosity at 25° C. at least 100% and preferably at least 10 times greater than the viscosity of a solution of the unthickened product in an equal volume of acetone. A sample of the mass in the container was poured out of the container and placed in an oven at 300° F. and maintained therein over night and the next morning was found to be a solid, infusible, tough resin having good chemical resistance.

*Example 9*

100 grams of Product HA and 20 cc. of diethyl sulphate were mixed in a beaker and allowed to stand at room temperature for 3 weeks. At the end of that period, the viscosity of the mass at 25° C. was more than 10 times that of Product HA at 25° C. A sample of the mass was then placed in an oven at 300° F. and was found to be a very tough, infusible resin after 16 hours.

*Example 10*

The various hydrogenated products were mixed with diethyl sulphate and these mixtures were employed as impregnants and coatings on bases. The so-treated bases were placed in an oven at 300° F. and after 16 hours the component had been converted to the infusible, tough, chemically resistant mass.

*Example 11*

The partially hydrogenated mono- and di-furfuryl acetone compounds, examples of which are HA-1, HA-2, HB-1, HB-2, HC-1 and HC-2 were each found to be excellent plasticizers and solvents for the polymers and copolymers of the vinyl esters, such as polyvinyl chloride, polyvinyl acetate, etc.

The method which I have employed for ascertaining the pH of the various materials herein is that commonly used in the art for materials free of water or being water insoluble and is as follows: About a 10-20 cc. sample of the material whose pH is to be ascertained is placed in a test tube containing an equal volume of distilled water. The mixture is heated to boiling while being shaken and then allowed to stand and come to room temperature. Then this aqueous mass is tested with pH test paper commonly employed in the art.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel compositions of matter herein claimed without departing from the spirit of the invention. Particularly it is to be understood that in said claims, ingredients or components recited in the singular are intended to include compatible mixtures of said ingredients whereever the sense permits.

This application is a continuation-in-part of my co-pending application serial No. 732,124, filed March 3, 1947, now abandoned, and copending application Serial No. 740,472, filed April 9, 1947, now abandoned.

Having thus described my invention, what I claim is:

1. A novel composition of matter capable of being heat converted to the substantially solid and infusible state comprising a mixture of an acidic agent and a partially hydrogenated product selected from the group consisting of (a) partially hydrogenated mono-furfuryl ketone, (b) partially hydrogenated di-furfuryl ketone, (c) partially hydrogenated organic reaction masses, said reaction masses before hydrogenation having a viscosity of at least 50 cp. at 25° C. and produced by reacting under alkaline conditions furfuraldehyde and a ketone having two hydrogen atoms on an alpha carbon, (d) resinous residues obtained by the heat distillation of said partially hydrogenated reaction masses, the pH of said mixture being in the range of .3 to 4, said partially hydrogenated products having saturated with hydrogen to the extent of approximately 15%–65% the normally present carbon to carbon double bonds in said products before hydrogenation.

2. A novel composition of matter capable of being heat converted to the substantially solid and infusible state comprising a partially hydrogenated product thickened in the presence of an acidic agent in amount sufficient to impart a pH of .3–4 to a mixture of said product and said agent, said product before thickening having a viscosity of no greater than 50% of that of the thickened product at 25° C. and selected from the group consisting of (a) partially hydrogenated mono-furfuryl ketone, (b) partially hydrogenated di-furfuryl ketone, (c) partially hydrogenated organic reaction masses, said reaction masses before hydrogenation having a viscosity of at least 50 cp. at 25° C. and produced by reacting under alkaline conditions furfuraldehyde and a ketone having two hydrogen atoms on an alpha carbon, (d) resinous residues obtained by the heat distillation of said partially hydrogenated reaction masses, said partially hydrogenated products having saturated with hydrogen to the extent of approximately 15%–65% the normally present carbon to carbon double bonds in said products before hydrogenation.

3. A novel composition of matter comprising a substantially solid and infusible resin produced by heat curing a thickened product defined in claim 2.

4. A novel composition of matter capable of being heat converted to the substantially solid and infusible state comprising a mixture of a di-furfuryl ketone being saturated with hydrogen to the extent of approximately 15%–65% of the carbon to carbon double bonds thereof and an acidic agent, the pH of said mixture being in the range of .3 to 4.

5. A novel composition of matter comprising a mixture of an acidic agent and a partially hydrogenated organic reaction mass, said mass before hydrogenation having a viscosity of at least 50 cp. at 25° C. and produced by reacting under alkaline conditions furfuraldehyde and a ketone having two hydrogen atoms on an alpha carbon, the pH of said mixture being in range of .3 to 4, said partially hydrogenated reaction mass having saturated with hydrogen to the extent of approximately 15%–65% the normally present carbon to carbon double bonds in said reaction mass before hydrogenation.

6. A novel composition of matter as defined in claim 2 and in which the ketone is acetone.

7. A novel composition of matter as defined in claim 2 and in which the ketone is methyl ethyl ketone.

8. A novel composition of matter as defined in claim 2 and in which the ketone is mesityl oxide.

9. The method comprising with the aid of heat thickening a partially hydrogenated product in the presence of an acidic agent in amount sufficient to impart a pH of .3–4 to a mixture of said product and agent, said product before thickening having a viscosity of no greater than 50% of that of the thickened product at 25° C. and selected from the group consisting of (a) partially hydrogenated mono-furfuryl ketone, (b) partially hydrogenated di-furfuryl ketone, (c) partially hydrogenated organic reaction masses, said reaction masses before hydrogenation having a viscosity of at least 50 cp. at 25° C. and produced by reacting under alkaline conditions furfuraldehyde and a ketone having two hydrogen atoms on an alpha carbon, (d) resinous residue obtained by the heat distillation of said partially hydrogenated reaction masses, said partially hydrogenated products having saturated with hydrogen to the extent of approximately 15%–65% the normally present carbon to carbon double bonds in said products before hydrogenation.

10. The method comprising heating a mixture of a partially hydrogenated product and an acidic agent in amount sufficient to impart a pH of 2–3.5 to a mixture of said product and agent, said product selected from the group consisting of (a) partially hydrogenated mono-furfuryl ketone, (b) partially hydrogenated di-furfuryl ketone, (c) partially hydrogenated organic reaction masses, said reaction masses before hydrogenation having a viscosity of at least 50 cp. at 25° C. and produced by reacting under alkaline conditions furfuraldehyde and a ketone having two hydrogen atoms on an alpha carbon, (d) resinous residues obtained by the heat distillation of said partially hydrogenated reaction masses, said partially hydrogenated products having saturated with hydrogen to the extent of approximately 15%–65% the normally present carbon to carbon double bonds in said products before hydrogenation, said heating continued until an exothermic reaction ensues, and allowing said reaction to proceed until the desired viscosity is attained.

11. A novel composition of matter capable of being converted to the substantially solid and infusible state comprising a mixture of a quantity of a mono-furfuryl ketone being saturated with hydrogen to the extent of 15%–65% of the carbon to carbon double bonds thereof and an acidic agent, the pH of said mixture being in the range of .3 to 4.

MORTIMER T. HARVEY.

No references cited.